(12) United States Patent
Ahn

(10) Patent No.: US 7,443,458 B2
(45) Date of Patent: Oct. 28, 2008

(54) LIQUID CRYSTAL DISPLAY WITH WIDE VIEWING ANGLE

(75) Inventor: Soon-il Ahn, Cheonan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 308 days.

(21) Appl. No.: 11/481,708

(22) Filed: Jul. 5, 2006

(65) Prior Publication Data

US 2007/0007525 A1     Jan. 11, 2007

(30) Foreign Application Priority Data

Jul. 9, 2005     (KR) ..................... 10-2005-0061967

(51) Int. Cl.
*G02F 1/1343* (2006.01)

(52) U.S. Cl. ............................. 349/43; 349/39; 349/46; 349/145

(58) Field of Classification Search ................... 349/38, 349/39, 42, 43, 48, 110, 128, 129, 143, 144, 349/146; 345/87, 92; 313/500, 505
See application file for complete search history.

(56) References Cited

U.S. PATENT DOCUMENTS 6,724,443 B1 *  4/2004  Sano et al. .................... 349/39
7,136,116 B2 * 11/2006  Sakamoto et al. ............. 349/43
7,206,048 B2 *  4/2007  Song ........................... 349/129

* cited by examiner

*Primary Examiner*—Hemang Sanghavi
(74) *Attorney, Agent, or Firm*—MacPherson Kwok Chen & Heid LLP

(57) ABSTRACT

A liquid crystal display (LCD) capable of preventing texture, light leakage, and/or formation of an instantaneous afterimage while improving an aperture ratio is presented. The LCD includes a first insulating substrate, a gate line formed on the first insulating substrate, a data line insulated from the gate line and extending substantially perpendicularly to the gate line wherein the gate line and the data line define a pixel, and a thin film transistor (TFT) connected to the gate line and the data line. A first sub-pixel electrode is connected to the TFT, and a second sub-pixel electrode is capacitively coupled to the first sub-pixel electrode through a coupling electrode, the second sub-pixel electrode being separated from the first sub-pixel electrode by a gap. The LCD also includes a second insulating substrate, a common electrode formed on the second insulating substrate and including a domain divider, and a liquid crystal layer interposed between the first insulating substrate and the second insulating substrate. A coupling electrode connecting portion connects the TFT to the coupling electrode and intersects the gap at a region along an edge of the pixel.

19 Claims, 11 Drawing Sheets

LIQUID CRYSTAL DISPLAY WITH WIDE VIEWING ANGLE

BACKGROUND OF THE INVENTION

This application claims priority from Korean Patent Application No. 10-2005-0061967 filed on Jul. 9, 2005, in the Korean Intellectual Property Office, the disclosure of which is incorporated herein by reference in its entirety.

1. Field of the Invention

The present invention relates to a liquid crystal display (LCD), and more particularly, to an LCD in which a pixel is divided into a plurality of domains to increase the viewing angle.

2. Description of the Related Art

A liquid crystal display (LCD) is one of the most widely used type of flat panel display today. An LCD includes two substrates provided with field-generating electrodes, such as a pixel electrode and a common electrode, and a liquid crystal (LC) layer interposed therebetween. The LCD displays images by applying voltages to the field-generating electrodes to generate an electric field in the LC layer, which determines orientations of LC molecules in the LC layer to adjust the polarization of light that passes through the LC layer.

Various techniques for increasing the viewing angle have been suggested. In particular, one technique uses vertically aligned LC molecules and provides cutouts and protrusions at each field-generating electrode.

The wide viewing angle of the VA mode LCD can be realized by cutouts in the field-generating electrodes and protrusions on the field-generating electrodes. Since the cutouts and the protrusions can determine the orientation of the LC molecules, light can be made to propagate in different directions by using the cutouts and the protrusions. By controlling the light to propagate in different directions, the reference viewing angle is widened.

A domain-division type LCD may also be used to widen the viewing angle. In a domain-division type LCD, domains are divided into multiple groups and different data voltages are applied to the respective domain groups. In particular, one pixel is divided into at least two domain groups and different data voltages are applied to the respective domain groups.

In such a conventional LCD, there is a gap between the domain groups. The liquid crystal alignment is disturbed by the electric fields in different lateral directions at the intersection between this gap and a coupling electrode connecting portion connecting the drain electrodes. This disturbance in the liquid crystal alignment results in undesirable texture and light leakage. In particular, when a screen is changed from black to white in a normally black mode, the intersection stays black a little while longer than the rest of the display (referred to as an instantaneous afterimage).

A method of achieving a wide viewing angle without the above problems is desired.

SUMMARY OF THE INVENTION

The present invention provides a liquid crystal display (LCD) capable of providing a wide viewing angle while avoiding texture, light leakage, or formation of an instantaneous afterimage.

In one aspect, the invention is a liquid crystal display (LCD). The LCD includes a first insulating substrate, a gate line formed on the first insulating substrate, a data line insulated from the gate line and extending substantially perpendicularly to the gate line, wherein the gate line and the data line define a pixel, and a thin film transistor (TFT) connected to the gate line and the data line. A first sub-pixel electrode is connected to the TFT, a second sub-pixel electrode is capacitively coupled to the first sub-pixel electrode through a coupling electrode, and the second sub-pixel electrode is separated from the first sub-pixel electrode by a gap. The LCD also includes a second insulating substrate, and a common electrode formed on the second insulating substrate and including a domain divider. A liquid crystal layer is interposed between the first insulating substrate and the second insulating substrate. A coupling electrode connecting portion connects the TFT to the coupling electrode and intersects the gap at a region along an edge of the pixel.

In another aspect, the invention is a liquid crystal display (LCD) including a first insulating substrate, a gate line formed on the first insulating substrate, a data line insulated from the gate line and extending substantially perpendicularly to the gate line, wherein the gate line and the data line define a pixel, and a thin film transistor (TFT) connected to the gate line and the data line. A first sub-pixel electrode is connected to the TFT, a second sub-pixel electrode is capacitively coupled to the first sub-pixel electrode through a coupling electrode, and the second sub-pixel electrode is separated from the first sub-pixel electrode by a gap. The LCD also includes a second insulating substrate, and a common electrode formed on the second insulating substrate and including a domain divider. A liquid crystal layer is interposed between the first insulating substrate and the second insulating substrate. A coupling electrode connecting portion connects the TFT to the coupling electrode and includes a portion extending along the gap at an intersection of the coupling electrode connecting portion and the gap.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1A:
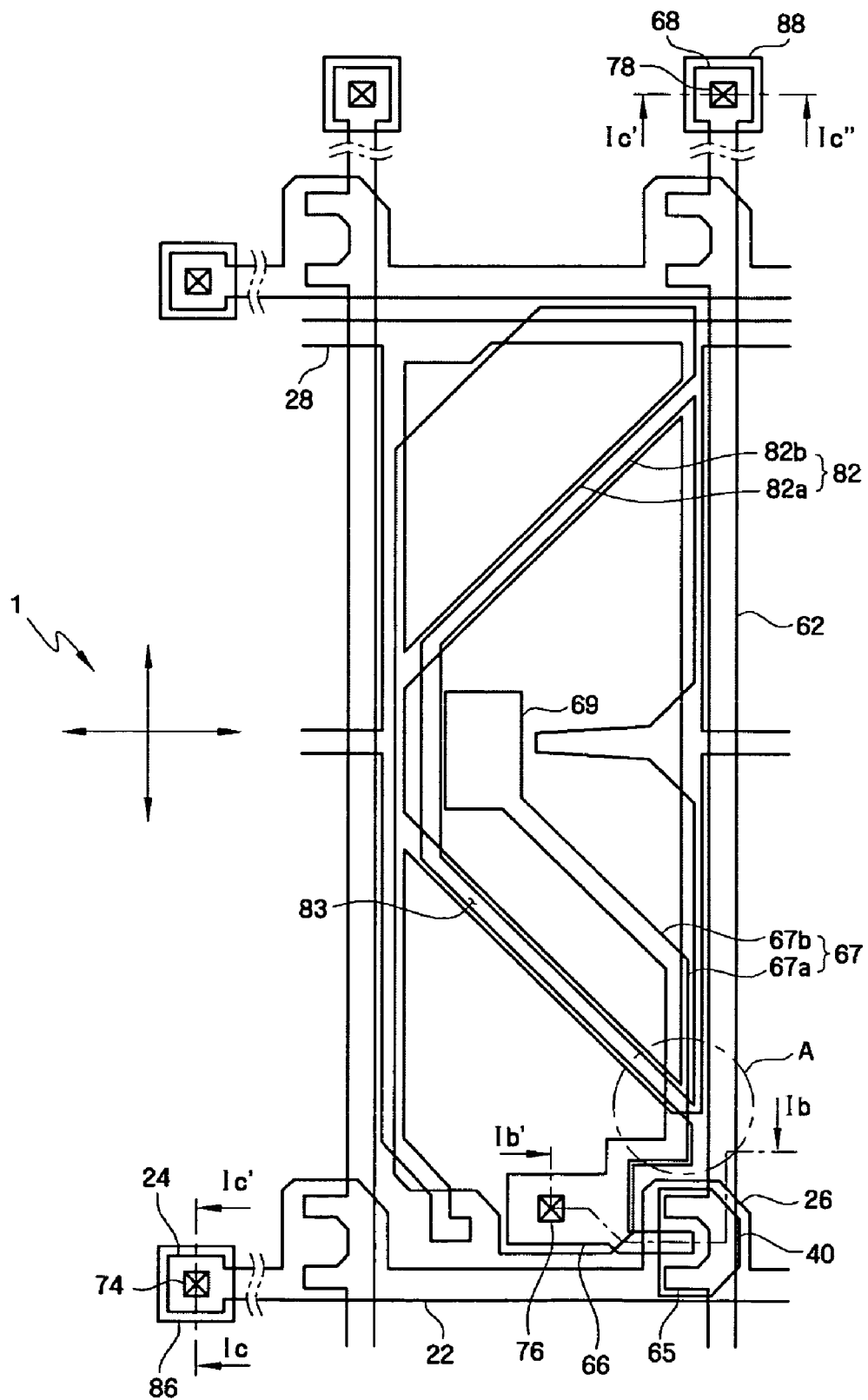
FIG. 1A is a layout of a thin film transistor (TFT) display substrate of an LCD according to an exemplary embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to illustrations of a method of a liquid crystal display according to embodiments of the invention.

A liquid crystal display (LCD) according to the present invention includes a thin film transistor (TFT) substrate including a TFT, a common electrode substrate positioned substantially parallel to the TFT substrate, and a liquid crystal layer interposed between the TFT substrate and the common electrode substrate. A TFT is defined by a gate line and a data line. A common electrode substrate often includes a color filter. The liquid crystal molecules are aligned such that their main axes are substantially perpendicular to the TFT substrate and the common electrode substrate.

Figure 1B:
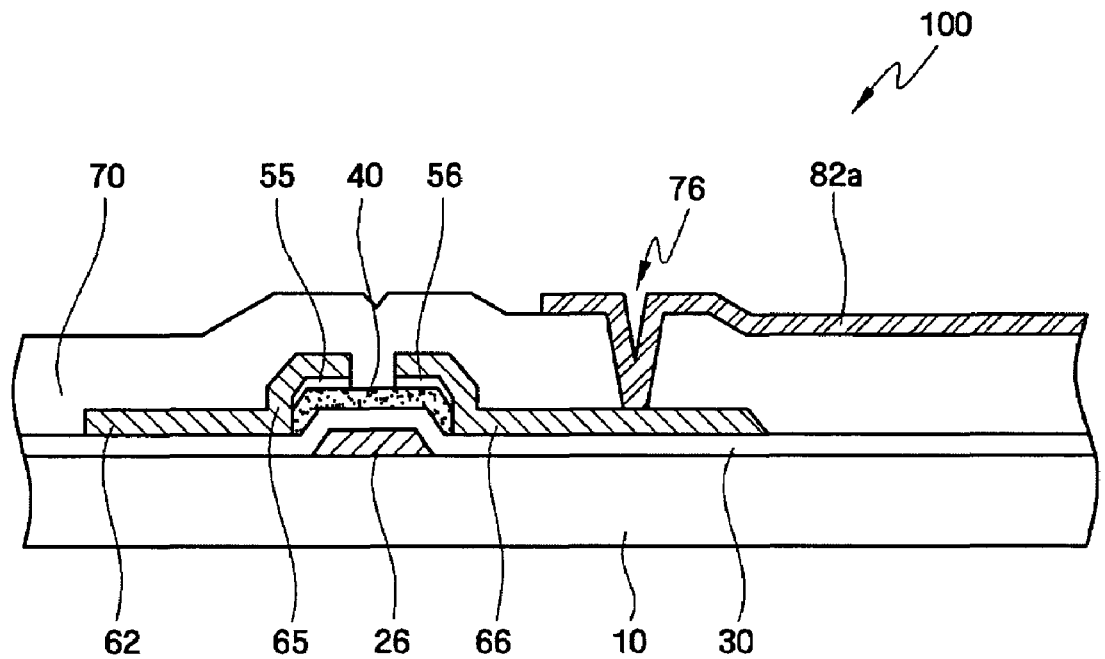
FIG. 1B is a cross-sectional view taken along line 1b-1b' of FIG. 1A.
Figure 1C:
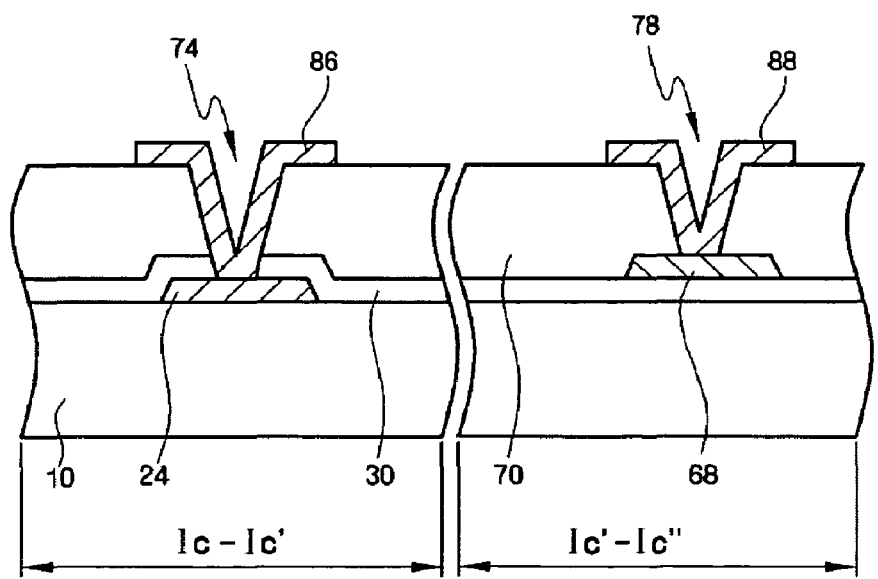
FIG. 1C is a cross-sectional view taken along line 1c-1c' of FIG. 1A.

First, a TFT substrate will be described in detail with reference to FIGS. 1A through 1C. FIG. 1A is a layout of a TFT substrate of an LCD according to an exemplary embodiment of the present invention, FIG. 1B is a cross-sectional view taken along line 1b-1b' of FIG. 1A, and FIG. 1C is a cross-sectional view taken along line 1c-1c' of FIG. 1A.

A gate line 22 extends in a first direction on an insulating substrate 10 and a gate electrode 26 is formed to branch from the gate line 22. A gate line end portion 24 is formed at an end of the gate line 22 to receive a gate signal from another layer or an external circuit and transmit the received gate signal to the gate line 22. The gate line end portion 24 is made to be wider than the gate line 22 for easy connection to an external circuit. The gate line 22, the gate electrode 26, and the gate line end portion 24 form a gate wire (22, 26, 24). A storage electrode wire 28 is formed on the insulating substrate 10. The storage electrode wire 28 extends substantially parallel to the gate line 22 in the first direction and is formed along the edges of first and second sub-pixel electrodes 82a and 82b in a pixel, which will later be described. In order to increase the aperture ratio of an LCD, the shape and arrangement of the storage electrode wire 28 may be changed in various manner as long as it is capable of forming a storage capacitor in conjunction with the first and second sub-pixel electrodes 82a, 82b.

The gate wire (22, 24, 26) and the storage electrode wire 28 are preferably made of an Al-containing metal such as Al and Al alloy, an Ag-containing metal such as Ag and Ag alloy, a Cu-containing metal such as Cu and Cu alloy, a Mo-containing metal such as Mo and Mo alloy, Cr, Ti or Ta. In addition, the gate wire (22, 24, 26) and the storage electrode wire 28 have a multi-layered structure including two conductive films (not shown) having different physical characteristics. One of the two films is preferably made of a low-resistivity metal such as an Al-containing metal, an Ag-containing metal, or a Cu-containing metal for reducing signal delay or voltage drop in the gate wire (22, 24, 26) and the storage electrode wire 28. The other film is preferably made of material such as a Mo-containing metal, Cr, Ta or Ti, which have good physical, chemical, and electrical contact characteristics with other materials such as indium tin oxide (ITO) or indium zinc oxide (IZO). An exemplary combination of the two films is a lower Cr film combined with an upper Al film. Another combination is a lower Al film and an upper Mo film. However, these are not limitations of the invention and the gate wire (22, 24, 26) and the storage electrode wire 28 may be made of various metal or conductor combinations.

A gate insulation layer 30 is formed on the gate wire (22, 24, and 26) and the storage electrode wire 28.

A semiconductor layer 40 made of hydrogenated amorphous silicon or polycrystalline silicon is formed on the gate insulating layer 30. The semiconductor layer 40 may be shaped such that it looks like an island or a line in plan view. For example, in the illustrative embodiment of FIG. 1A, the semiconductor layer 40 is formed as an island. In a different embodiment where the semiconductor layer is formed as a line, it may be positioned below a data line 62 and extend to the gate electrode 26.

Ohmic contact layers 55 and 56 made of silicide or n+ hydrogenated amorphous silicon doped with high-concentration n-type impurity are formed on the semiconductor layer 40. The ohmic contact layers 55 and 56 may be formed as an island or a line. For example, in the illustrative embodiment of FIG. 1B, the ohmic contact layers 55 and 56 are formed under the drain electrode 66 and the source electrode 65 as islands. Line-shaped ohmic contact layers may be positioned to extend below the data line 62.

The data line 62 and a drain electrode 66 are formed on the ohmic contact layers 55 and 56 and the gate insulating layer 30. The data line 62 extends in a second direction and intersects the gate line 22 (in plan view) to define a pixel. The data line 62 may extend substantially perpendicularly to the gate line 22. The source electrode 65 extends from the data line 62 over the semiconductor layer 40. A data line end portion 68 is formed at an end of the data line 62 to receive a data signal from another layer or an external circuit and transmit the received data signal to the data line 62. The data line end portion 68 is made to be wider than the data line 62 for easy connection to the external circuit. The drain electrode 66 is separated from the source electrode 65 and positioned over the semiconductor layer 40 such that they are across the gate electrode 26 from each other.

The drain electrode 66 is shaped into a stripe and an extension pattern extending from the stripe. The stripe is on the semiconductor layer 40. The extension pattern has a large area and a contact hole 76. A coupling electrode 69, which is made of the same material as the drain electrode 66, is formed on the same layer as and connected to the drain electrode 66 through a coupling electrode connecting portion 67. The coupling electrode 69 is wider than the coupling electrode connecting portion 67 to overlap the second sub-pixel electrode 82b and form a coupling capacitor. The coupling electrode connecting portion 67 includes a first portion 67a that extends vertically in reference to FIG. 1A along the data line 62 and a second portion 67b that extends diagonally in reference to FIG. 1A. The second portion 67b connects the first portion 67a and the coupling electrode 69. The coupling electrode 69 and the coupling electrode connecting portion 67 are provided for the purpose of preventing undesirable effects such as texture, light leakage, and instantaneous afterimage, as will later be described with reference to FIG. 5.

The data line 62, the data line end portion 68, the source electrode 65, the drain electrode 66, the coupling electrode 69, and the coupling electrode connecting portion 67 form a data wire (62, 68, 65, 66, 69, 67).

The data wire (62, 68, 65, 66, 69, 67) is preferably made of refractory metal such as Cr, Mo, Ti, Ta or an alloy thereof. Also, the data wire (62, 68, 65, 66, 69, 67) may have a multilayered structure including a low-resistivity film (not shown) and a contact-enhancing film (not shown). Examples of the multi-layered structure include a double-layered structure having a lower Cr film and an upper Al film, a double-layered structure having a lower Al film and an upper Mo film, and a triple-layered structure having a lower Mo film, an intermediate Al film, and an upper Mo film.

The source electrode 65 overlaps at least a portion of the semiconductor layer 40. The drain electrode 66 is across the gate electrode 26 from the source electrode 65 and overlaps at least a portion of the semiconductor layer 40. Here, the ohmic contact layers 55 and 56 are interposed between the semiconductor layer 40 and each of the source electrode 65 and the drain electrode 67 to reduce the contact resistance between the semiconductor layer 40 and the source/drain electrodes 65, 67.

A passivation layer 70 made of an organic insulating layer is formed on the data line 62, the drain electrode 66, and an exposed portion of the semiconductor layer 40. Here, the passivation layer 70 is preferably made of an inorganic insulator such as silicon nitride or silicon oxide, a photosensitive organic material having a good flatness characteristic, or a low dielectric insulating material such as a-Si:C:O and a-Si:O:F formed by plasma enhanced chemical vapor deposition (PECVD). Alternatively, the passivation layer 70 may be a double-layered structure having a lower inorganic film and an upper organic film in order to protect the exposed semiconductor layer 40 while maintaining superb characteristics as an organic layer.

Contact holes 76 and 78 exposing the drain electrode 66 and the data line end portion 68 are formed on the passivation layer 70 and a contact hole 74 exposing the gate line end portion 24 is formed on the passivation layer 70 and the gate insulating layer 30.

A pixel electrode 82 is formed on the passivation layer 70 substantially following the outline of a pixel. As explained above, the pixel electrode 82 includes the first and second sub-pixel electrodes 82a and 82b. The first and second sub-pixel electrodes 82a, 82b are separated by a gap 83 forming an angle of about 45 degrees or −45 degrees with a transmission axis 1 of a polarizing plate. The second sub-pixel electrode 82b is formed in a rotated 'V' shape with the pointy portion flattened and is located in the middle of a pixel region. The first sub-pixel electrode 82a is formed on a portion of the pixel region where the second sub-pixel electrode 82b is not formed. Here, a plurality of cutouts (not shown) or protrusions (not shown) may be formed in or on the first and second sub-pixel electrodes 82a and 82b diagonally with respect to FIG. 1A.

One of the first sub-pixel electrodes 82a is electrically connected to the drain electrode 66 through the contact hole 76, and the second sub-pixel electrode 82b is coupled, but not directly, to the drain electrode 66 via the coupling electrode 67 extending from the drain electrode 66.

An auxiliary gate line end portion 86 and an auxiliary data line end portion 88 are formed on the passivation layer 70 and are connected to the gate line end portion 24 and the data line end portion 68, respectively, via the contact holes 74 and 78, respectively. The pixel electrode 82 and the auxiliary gate and data line end portions 86 and 88 are preferably made of a transparent conductor such as ITO or IZO or reflective conductor such as Al. The auxiliary gate line end portion 86 and the auxiliary data line end portion 88 are used for connecting the gate line end portion 24 and the data line end portion 68, respectively, to an external device.

The first sub-pixel electrode 82a is electrically connected to the drain electrode 66 through the contact hole 76. The second sub-pixel electrode 82b is not directly connected to the drain electrode 66, but is coupled to the drain electrode 66 through the coupling electrode connection unit 67 and the coupling electrode 69 extending from the drain electrode 66.

One of the first sub-pixel electrode 82a is physically and electrically connected to the drain electrode 66 through the contact hole 76, and the drain electrode 66 applies a data voltage to the first sub-pixel electrode 82a. The second sub-pixel electrode 82b is in an electrically floating state and is capacitively coupled to the first sub-pixel electrode 82a by the coupling electrode 67, which is connected to the drain electrode 66 and overlaps the second sub-pixel electrode 82b. In other words, the voltage of the second sub-pixel electrode 82b varies according to the voltage of the first sub-pixel electrode 82a connected to the drain electrode 66. The absolute value of the voltage of the second sub-pixel electrode 82b may be always smaller than the absolute value of the voltage of the first sub-pixel electrode 82a. However, the present invention is not restricted to this embodiment. For example, in another embodiment, the data voltage may be applied to the second sub-pixel electrode 82b, and a first sub-pixel electrode 82a may be capacitively coupled to the second sub-pixel electrode 82b.

When arranged in the pixel region in the above-mentioned manner, the difference between the data voltages applied to the first and second sub-pixel electrodes 82a and 82b is compensated to reduce a distortion of a gamma curve and widen a reference viewing angle. A coupling relationship between the first sub-pixel electrode 82a and the second sub-pixel electrode 82b will later be described in greater detail with reference to FIG. 4.

An alignment layer (not shown) for aligning a liquid crystal layer may be formed on the pixel electrode 82, the auxiliary gate line end portion 86, the auxiliary data line end portion 88, and the passivation layer 70.

Figure 2:
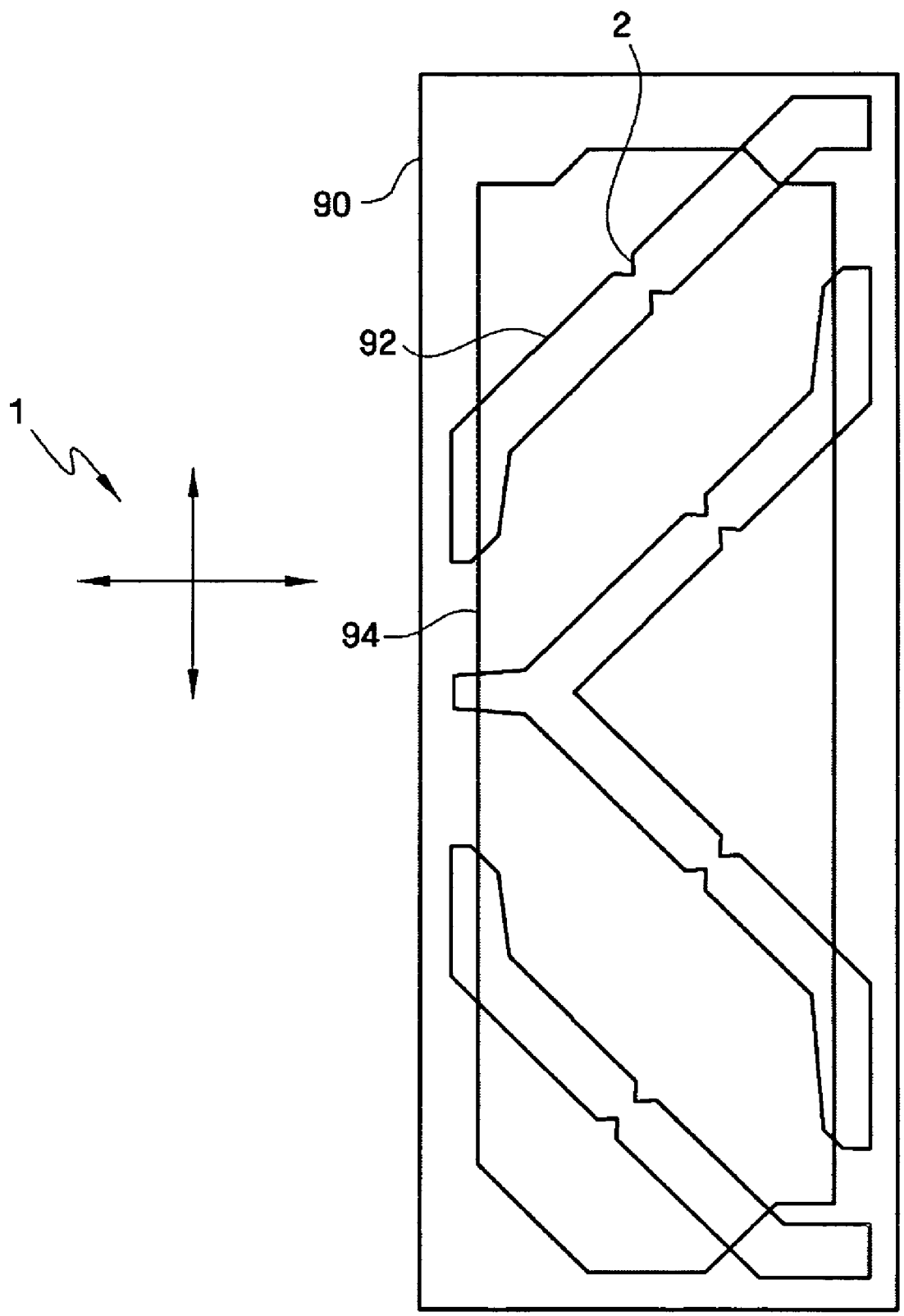
FIG. 2 is a layout of a common electrode display substrate of an LCD according to an exemplary embodiment of the present invention.
Figure 3A:
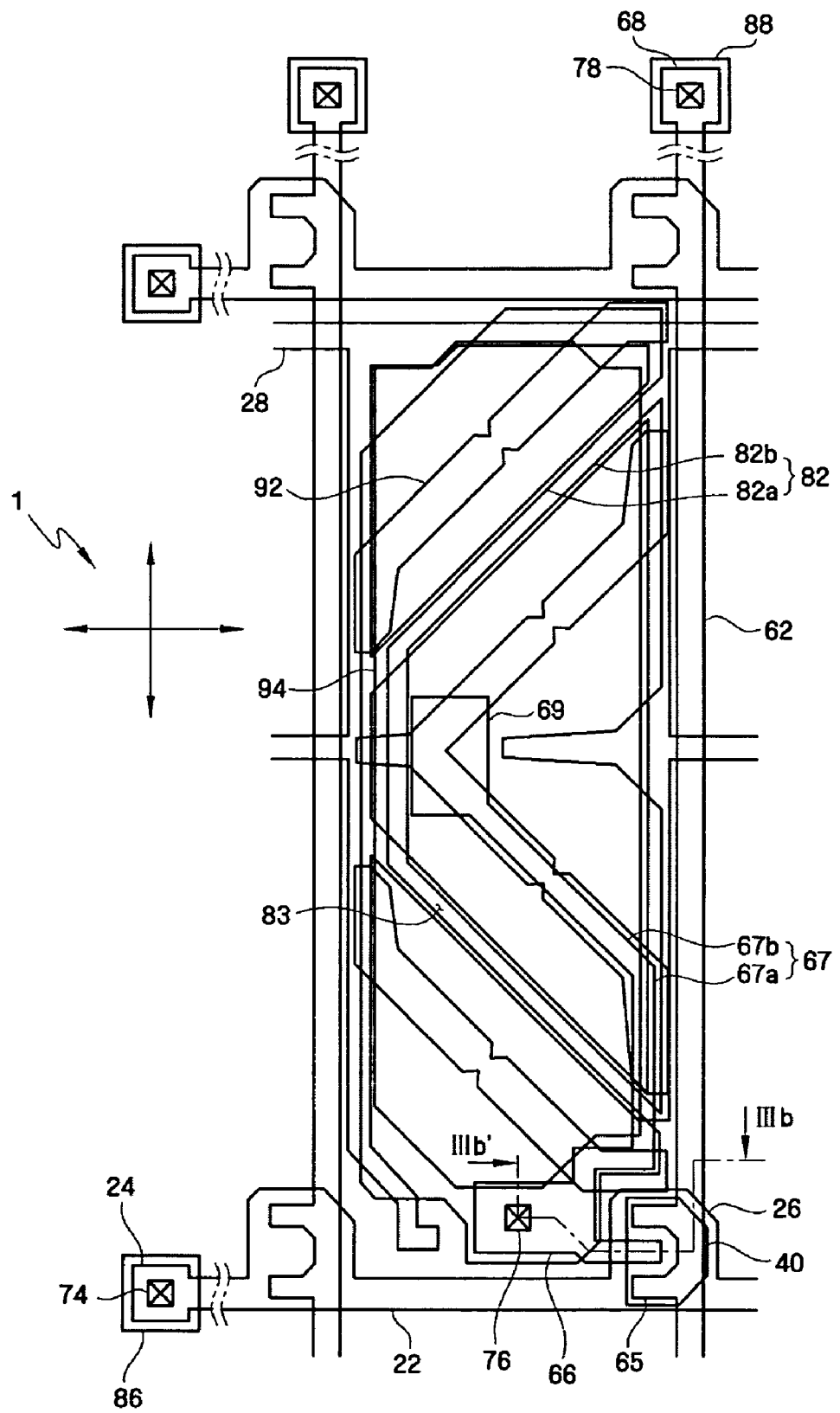
FIG. 3A is a layout of the TFT-LCD of FIG. 1A and the common electrode display substrate of FIG. 2.

Hereinafter, a common electrode substrate for an LCD according to an embodiment of the present invention and an LCD including the common electrode substrate will be described with reference to FIGS. 2 through 3B. FIG. 2 is a layout of a common electrode display substrate of an LCD according to an exemplary embodiment of the present invention, FIG. 3A is a layout of the TFT-LCD of FIG. 1A and the common electrode display substrate of FIG. 2, and FIG. 3B is a cross-sectional view taken along line IIIb-IIIb' of FIG. 3A.

Figure 3B:
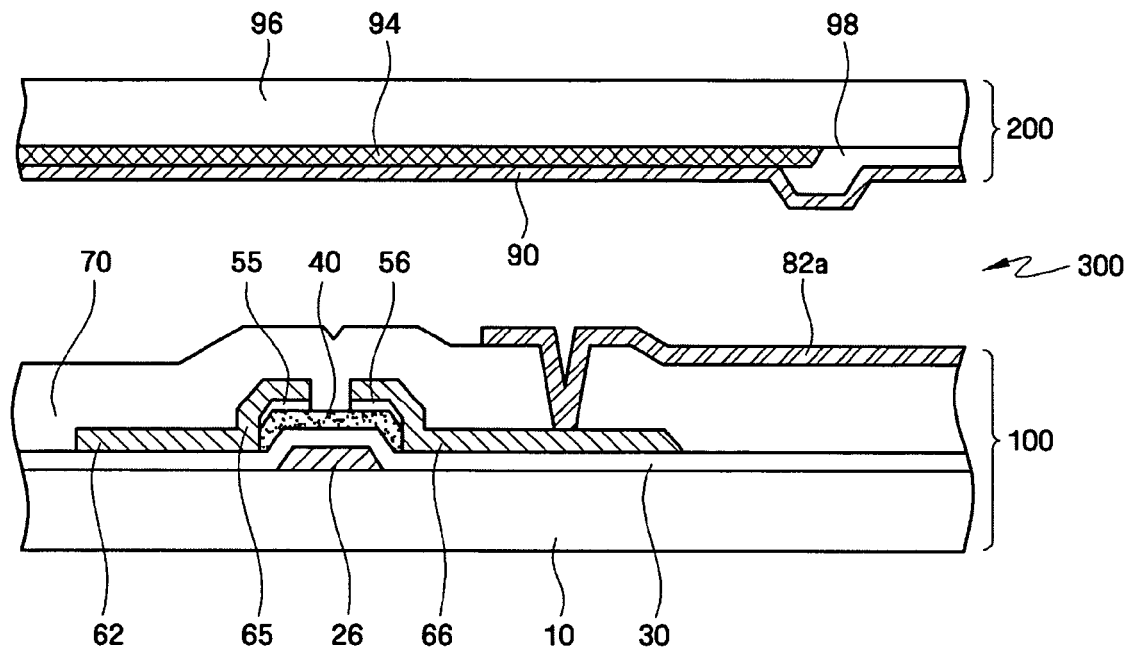
FIG. 3B is a cross-sectional view taken along line IIIb-IIIb' of FIG. 3A.

Referring to FIGS. 2 through 3B, a black matrix 94 for preventing light leakage and a red, green, and blue color filter 98 sequentially arranged in a pixel are formed on an insulating substrate 96 made of a transparent insulating material such as glass. The black matrix is preferably made of a metal or a metal oxide, such as chromium or chromium oxide, or an organic black resist.

A common electrode 90 includes a transparent conductive material such as indium titanium oxide (ITO) or indium zinc oxide (IZO). A cutout 92 is formed on the color filter 98. To effectively regulate the direction of liquid crystals under the cutout 92, it is preferable that a notch 2 be formed in a predetermined portion of the cutout 92 as shown in FIG. 2.

The common electrode 90 is substantially parallel to the pixel electrode 82 and includes the cutout 92 which forms an angle of about 45 degrees or −45 degrees with respect to the transmission axis 1 of a polarizing plate. The common electrode 90 may include protrusions (not shown) instead of the cutouts 92. The cutout 92 or the protrusion is herein referred to as a domain divider.

As mentioned, the pixel electrode 82 and has the cutout 92 inclined at an angle of 45 degrees or −45 degrees with respect to the transmission axis 1 of the polarizing plate. Where a protrusion portion is formed instead of the cutout 92, the protrusion portion may be formed in the same position as the cutout 92.

An alignment layer (not shown) in which liquid crystal molecules are aligned may be coated on the common electrode 90.

As shown in FIG. 3A, the cutout 92 of the common electrode 90 may be arranged so that the gap 83 that divides the pixel electrode 82 is positioned between two cutouts 92.

As shown in FIG. 3B, the TFT substrate 100 and the common electrode substrate 200 are combined and coupled to each other, and the liquid crystal layer 300 is formed between the TFT substrate 100 and the common electrode substrate 200. The liquid crystal layer 300 is vertically aligned, thereby forming the basic structure of the LCD according to an embodiment of the present invention.

The liquid crystal molecules in the liquid crystal layer 300 are aligned so that their major axes are oriented perpendicularly to the TFT substrate 100 and the common electrode substrate 200 in the absence of an electric field. The liquid crystal molecules in the liquid crystal layer 300 have a negative dielectric constant anisotropy. The TFT substrate 100 and the common electrode substrate 200 are arranged such that the pixel electrode 82 overlaps the color filter 98. A pixel is then divided into a plurality of domains by the cutout 92 of the common electrode 90 and a gap 83 of the pixel electrode 82. The pixel is divided into left and right domains. However, since the alignment directions of the liquid crystal molecules is different between a first portion and a second portion of the bent area of the pixel, the pixel is divided into a first domain and a second domain. In other words, the pixel is divided into a plurality of domains according to the alignment direction of the main director of liquid crystal molecules included in a liquid crystal layer when an electric field is applied.

The LCD is completed by combining a polarizing plate, a backlight, a compensation plate, and so on with the above-described basic structure.

A polarizing plate (not shown) may be installed on either substrate of the basic structure in such a manner that a first transmission axis is parallel to the gate line 22 and a second transmission axis is perpendicular to the gate line 22.

With the LCD having the above-described structure, liquid crystals in each domain of a pixel are oriented so that their major axis is perpendicular to the gap 83 or the cutout 92 when an electric field is applied to the liquid crystals. Thus, the liquid crystals in the domain form an angle of about 45 degrees or –45 degrees with respect to the transmission axis 1 of the polarizing plate. A lateral electric field formed in the gap 83 or the cutout 92 helps the liquid crystals in the domain to be aligned.

In this LCD, an image signal voltage is applied from a TFT to the first sub-pixel electrodes 82a, and the second sub-pixel electrode 82b is capacitively coupled to the first sub-pixel electrodes 82a. Thus, the voltage of the second sub-pixel electrode 82b varies according to the image signal voltage applied to the first sub-pixel electrodes 82a. The absolute value of the voltage of the second sub-pixel electrode 82b is smaller than the absolute value of the voltage of the first sub-pixel electrodes 82a. Accordingly, it is possible to reduce the likelihood of gamma curve distortion by arranging the first and second sub-pixel electrodes 82a and 82b having different voltages in a pixel in such a manner that they can be complementary to each other, as described above.

Figure 4:
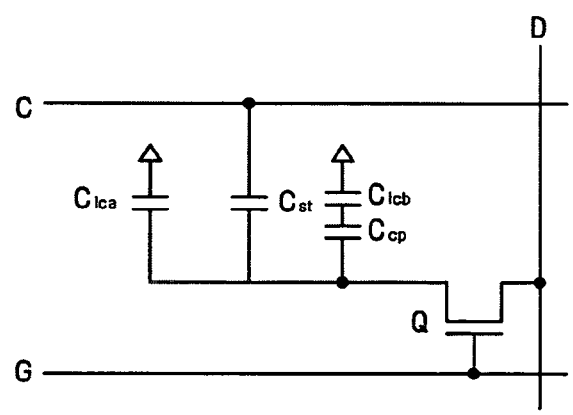
FIG. 4 is a circuit diagram of an LCD according to an exemplary embodiment of the present invention.

The reason for maintaining the voltage of the second sub-pixel electrode 82b at a lower level than that of the first sub-pixel electrode 82a will be described with reference to FIG. 4. FIG. 4 is a circuit diagram of an LCD according to an embodiment of the present invention.

In FIGS. 3A and 4, Clca indicates a liquid crystal capacity formed between the first sub-pixel electrode 82a and the common electrode 90, Cst indicates a sustain capacity formed between the first sub-pixel electrode 82a and the storage electrode wire 28, Clcb indicates a liquid crystal capacity formed between the second sub-pixel electrode 82b and the common electrode 90, and Ccp indicates a coupling capacity formed between the first sub-pixel electrode 82a and the second sub-pixel electrode 82b, i.e., formed by coupling between the second sub-pixel electrode 82b and the coupling electrode 69.

Referring to FIG. 4, a TFT Q of each pixel is a three-terminal device having a control terminal (or the gate electrode 26) connected to a gate line G 22, an input terminal (or the source electrode 65) connected to a data line D 62, and an output terminal (or the drain electrode 66) connected to liquid capacitors Clca and Clcb and a storage capacitor Cst.

The voltages across the first and second sub-pixel electrodes 82a and 82b are denoted by Va and Vb, respectively. The voltage distribution law results in:

$$Vb = Va \times [C_{cp}/(C_{cp} + C_{lcb})].$$

Since Vb=Va×[Ccp/(Ccp+Clcb)] according to the voltage divider rule and Ccp/(Ccp+Clcb) is smaller than 1 at all times, Vb is smaller than Va at all times. The ratio of Vb to Va can be adjusted by adjusting Ccp, and Ccp can be adjusted by adjusting the overlapping area or a distance between the second sub-pixel electrode 82b and the coupling electrode 69. As such, the arrangement of the coupling electrode 69 may vary.

Figure 5:
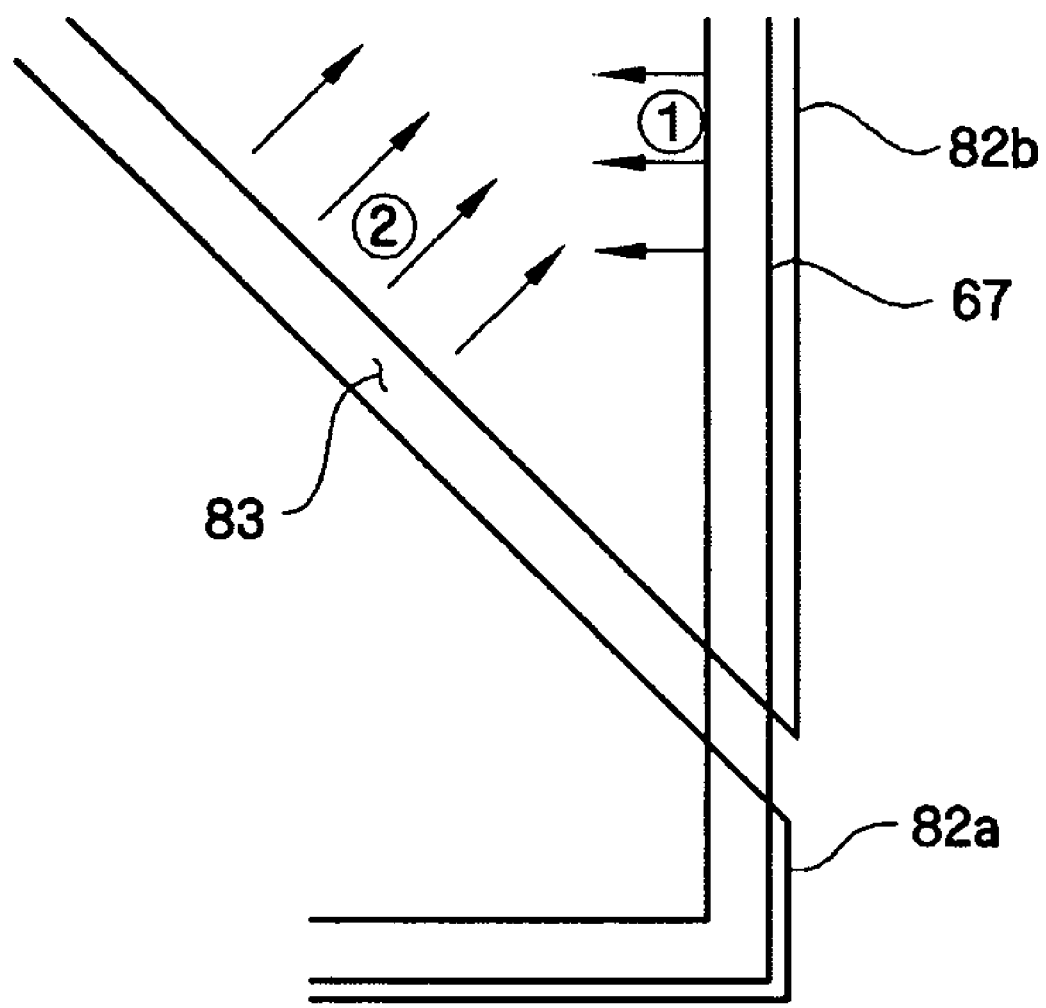
FIG. 5 is an enlarged layout view of a portion A of FIG. 1A.

Hereinafter, the principle of preventing texture, light leakage or an instantaneous afterimage in the LCD according to the present invention will be described in detail with reference to FIGS. 3A through 5. FIG. 5 is an enlarged layout view of a portion A of FIG. 1A, for convenient explanation of a relationship between the pixel electrode 82 and the coupling electrode connecting portion 67.

As mentioned above, the drain electrode 66 and the coupling electrode 69 are coupled through the coupling electrode connecting portion 67, and the pixel electrode 82 includes the first sub-pixel electrode 82a and the second sub-pixel electrode 82b separated by the gap 83. The gap 83 forms an angle of about 45 degrees or –45 degrees with respect to the transmission axis 1 of the polarizing plate. When a screen is changed from black to white in a vertical alignment LCD operating in a normally black mode, a data voltage V1 is applied to the first sub-pixel electrode 82a that is connected to the drain electrode 66. The data voltage V1 is delivered to the coupling electrode 69 through the coupling electrode connecting portion 67, which is also connected to the drain electrode 66. A data voltage V2 having the smaller absolute value than the data voltage V1 is delivered to the second sub-pixel electrode 82b by capacitive coupling between the coupling electrode 69 and the second sub-pixel electrode 82b.

As shown in FIG. 5, the higher data voltage V1 is applied to the first sub-pixel electrode 82a and the coupling electrode connecting portion 67, and the lower data voltage V2 is applied to the second sub-pixel electrode 82b. Since the same voltage is applied to the first sub-pixel electrode 82a and the coupling electrode connecting portion 67, there is no problem in the alignment of liquid crystals in the first sub-pixel electrode 82a. However, since different voltages are applied to the second sub-pixel electrode 82b and the coupling electrode connecting portion 67, the alignment of liquid crystals in the second sub-pixel electrode 82b is disturbed. More specifically, liquid crystals in a region ② around the second sub-pixel electrode 82b adjacent to the gap 83 are oriented such that their major axis is perpendicular to a length of the gap 83. However, since the data voltage V1 that is applied to the coupling electrode connecting portion 67 is higher than the voltage applied to the second sub-pixel electrode 82b, liquid crystals in a region ① around the coupling electrode connecting portion 67 are instantaneously inclined in a direction perpendicular to the coupling electrode connecting portion 67 and are gradually inclined in an oblique direction like other liquid crystals. Thus, when a screen is changed from black to white, a black afterimage (instantaneous afterimage) may remain instantaneously or a texture or light leakage may occur at an intersection between the gap 83 and the coupling electrode connecting portion 67.

To solve the instantaneous afterimage, the texture, or light leakage, as shown in FIG. 3A, the coupling electrode connecting portion 67 according to the present invention includes the first portion 67a extending from the drain electrode 66 adjacent to and along the data line 62 and the second portion 67b extending from the first portion 67a to the coupling electrode 69. The second portion 67b overlaps the cutout 92 of the common electrode 90. As such, the coupling electrode connecting portion 67, in particular, an intersection between the first portion 67a and the gap 83, is positioned at a region along an edge of a pixel where luminance is not greatly affected, thereby improving a display characteristic of an LCD. In addition, as shown in FIG. 3A, the intersection between the first portion 67a and the gap 83 overlap the cutout 92 of the common electrode 90, thereby reducing the region where texture could occur.

Moreover, the black matrix 94 is formed at the intersection between the first portion 67a and the gap 83, thereby preventing the formation of instantaneous afterimage and/or light leakage.

Since the second portion 67b of the coupling electrode connecting portion 67 is positioned in an oblique direction to overlap the cutout 92 of the common electrode 90, an aperture ratio can be improved.

Hereinafter, an LCD according to another embodiment of the present invention will be described with reference to FIGS. 6 and 7.

Figure 6:
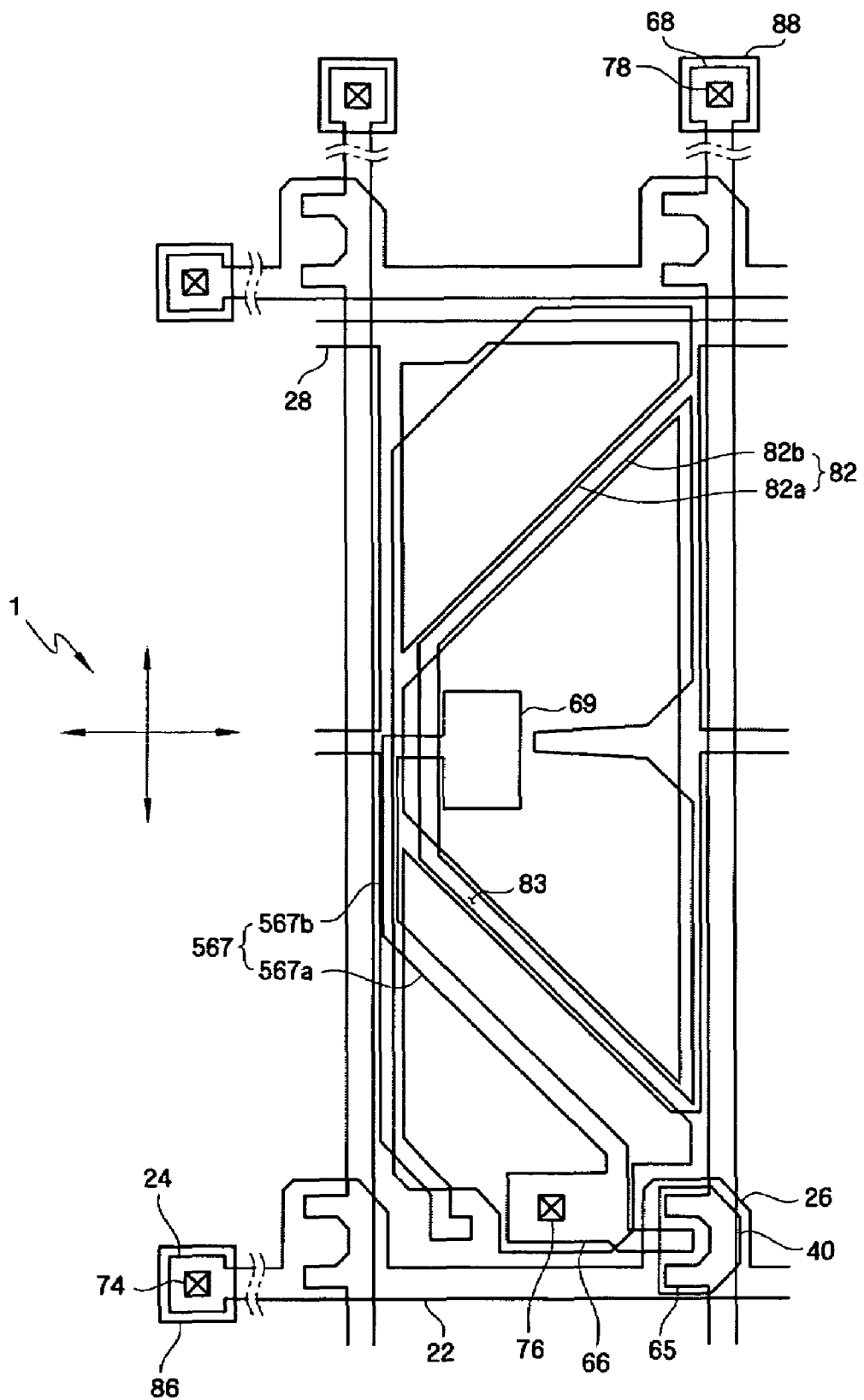
FIG. 6 is a layout of a TFT substrate of an LCD according to another embodiment of the present invention.
Figure 7:
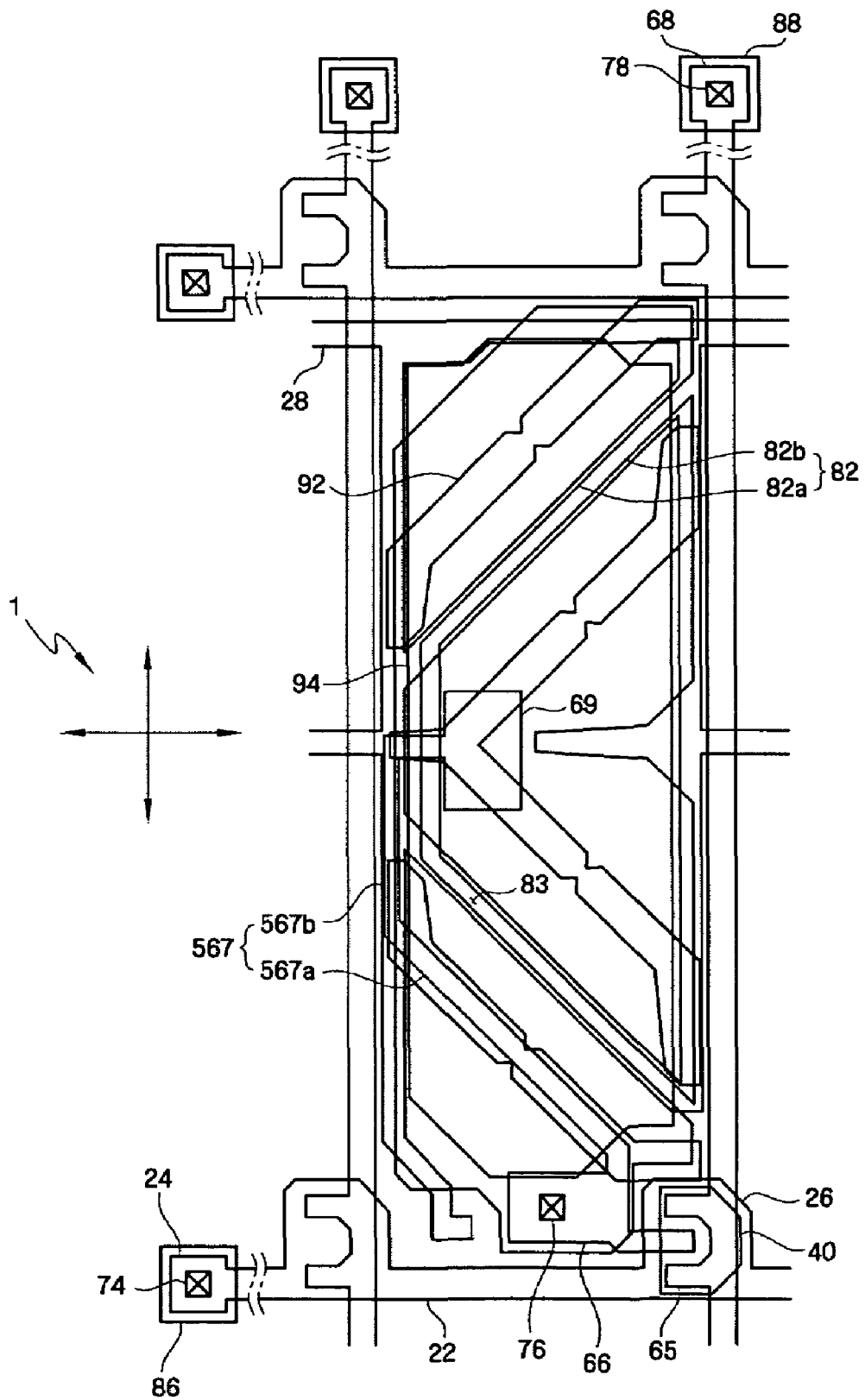
FIG. 7 is a layout of an LCD including the TFT substrate of FIG. 6.

FIG. 6 is a layout of a TFT substrate of an LCD according to another embodiment of the present invention, and FIG. 7 is a layout of an LCD including the TFT substrate of FIG. 6. A component having the same function as in the embodiments shown in FIGS. 1A through 5 is identified by the same reference numeral in FIGS. 6 and 7, and repetitive description will be omitted. As shown in FIGS. 6 and 7, the LCD according to the current embodiment of the present invention has a similar structure as the LCD according to the above embodiments of the present invention except for the following features.

As shown FIGS. 6 through 7, a coupling electrode connecting portion 567 according to the present invention includes a first portion 567a and a second portion 567b. The first portion 567a overlaps the cutout 92 of the common electrode 90 and extends in a direction that is oblique with respect to FIG. 6, starting from the drain electrode 66. The second portion 567b extends from the first portion 567a to the coupling electrode 69 along the data line 62. Thus, since the coupling electrode connecting portion 567, in particular the portion corresponding to an intersection between the second portion 567b and the gap 83, is positioned at an edge of a pixel where luminance is not greatly affected, the display characteristic of the LCD can be improved.

In addition, as shown in FIG. 7, the black matrix 94 is formed at the intersection between the second portion 567b and the gap 83, thereby preventing the instantaneous afterimage or light leakage.

Moreover, since the first portion 567a of the coupling electrode connecting portion 567 overlapping with the cutout 92 of the common electrode 90 is arranged in an oblique direction, the aperture ratio can be improved.

Hereinafter, an LCD according to still another embodiment of the present invention will be described with reference to FIGS. 8 through 10.

Figure 8:
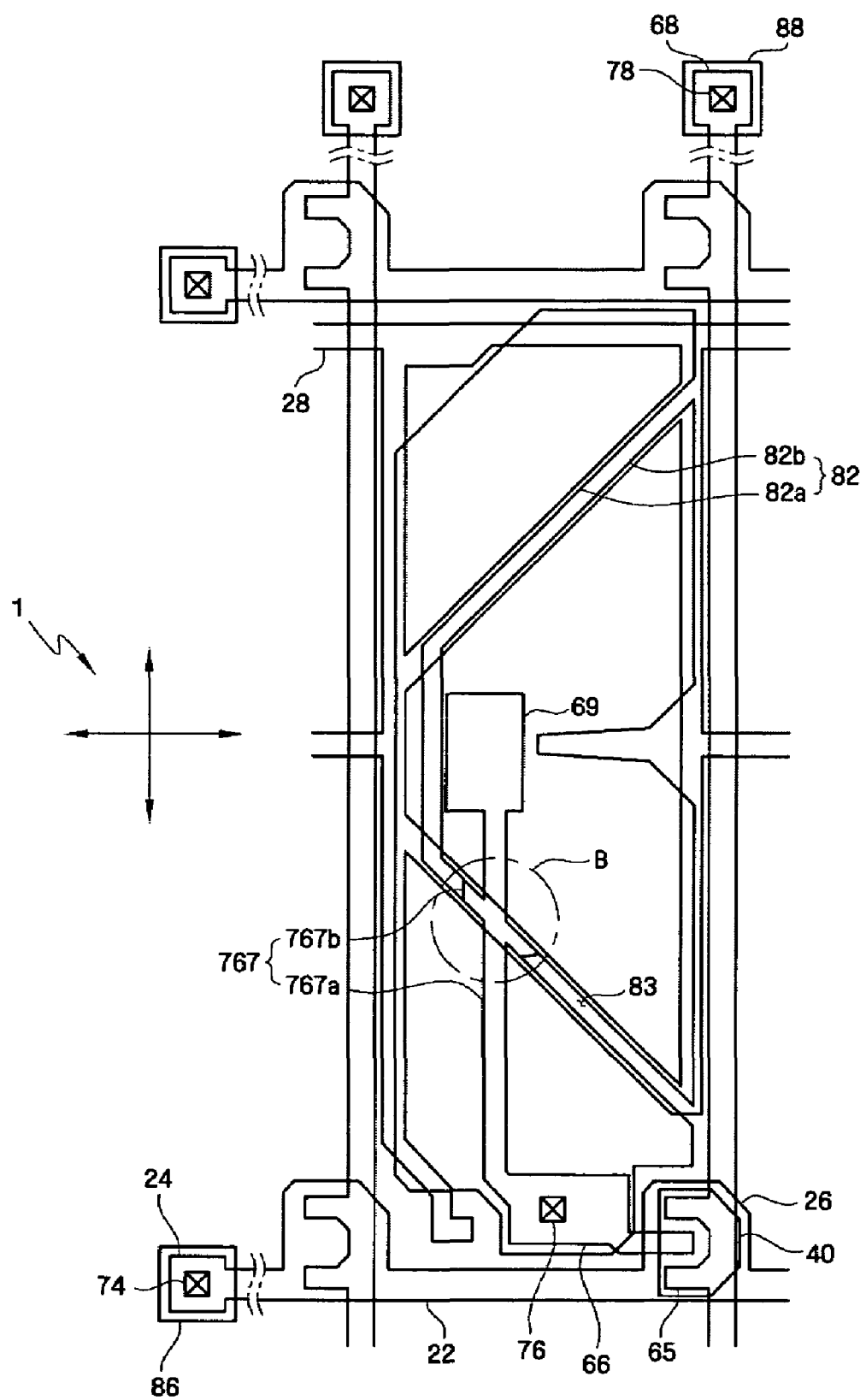
FIG. 8 is a layout of a TFT substrate of an LCD according to still another embodiment of the present invention.
Figure 9:
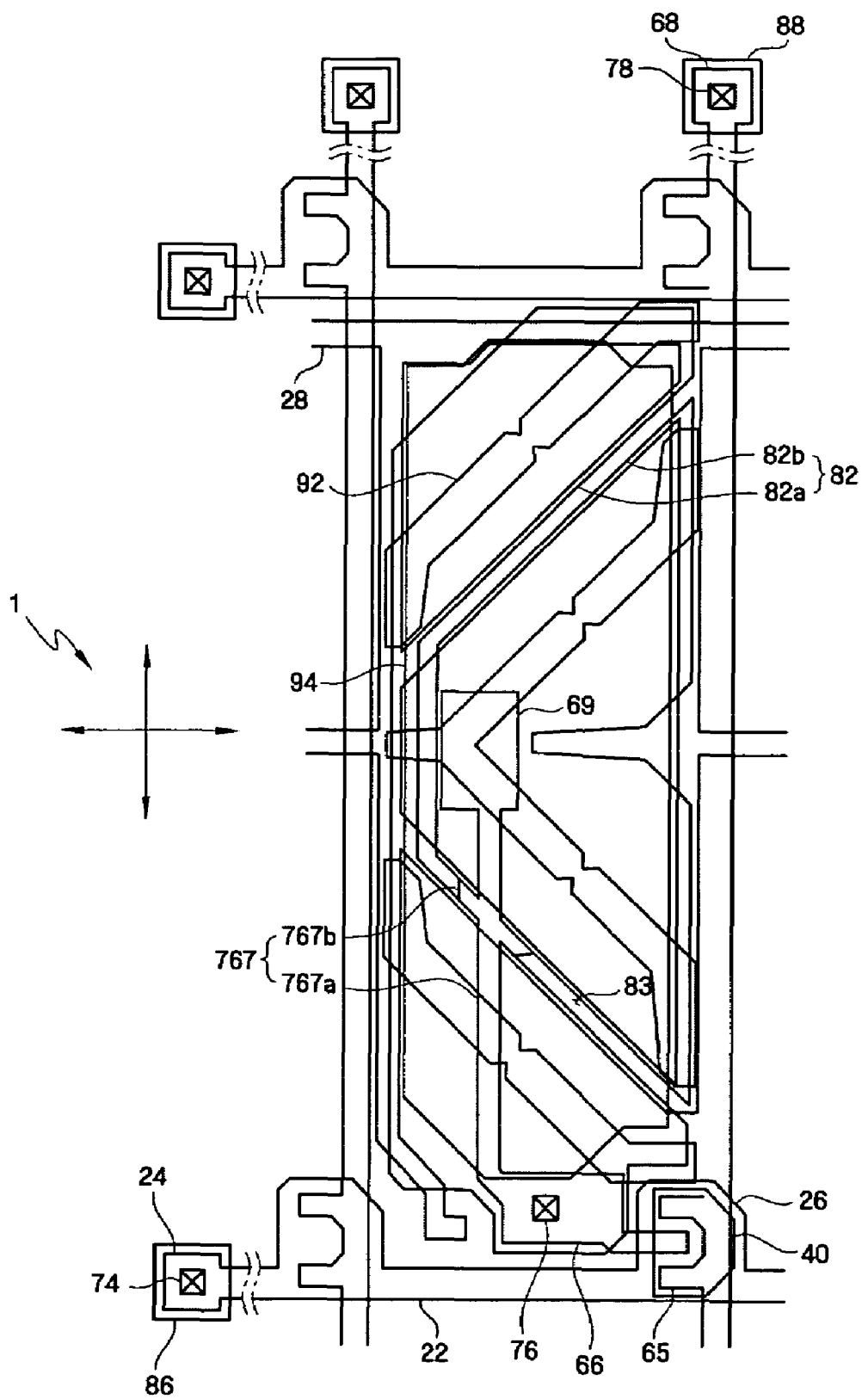
FIG. 9 is a layout of an LCD including the TFT substrate of FIG. 8.
Figure 10:
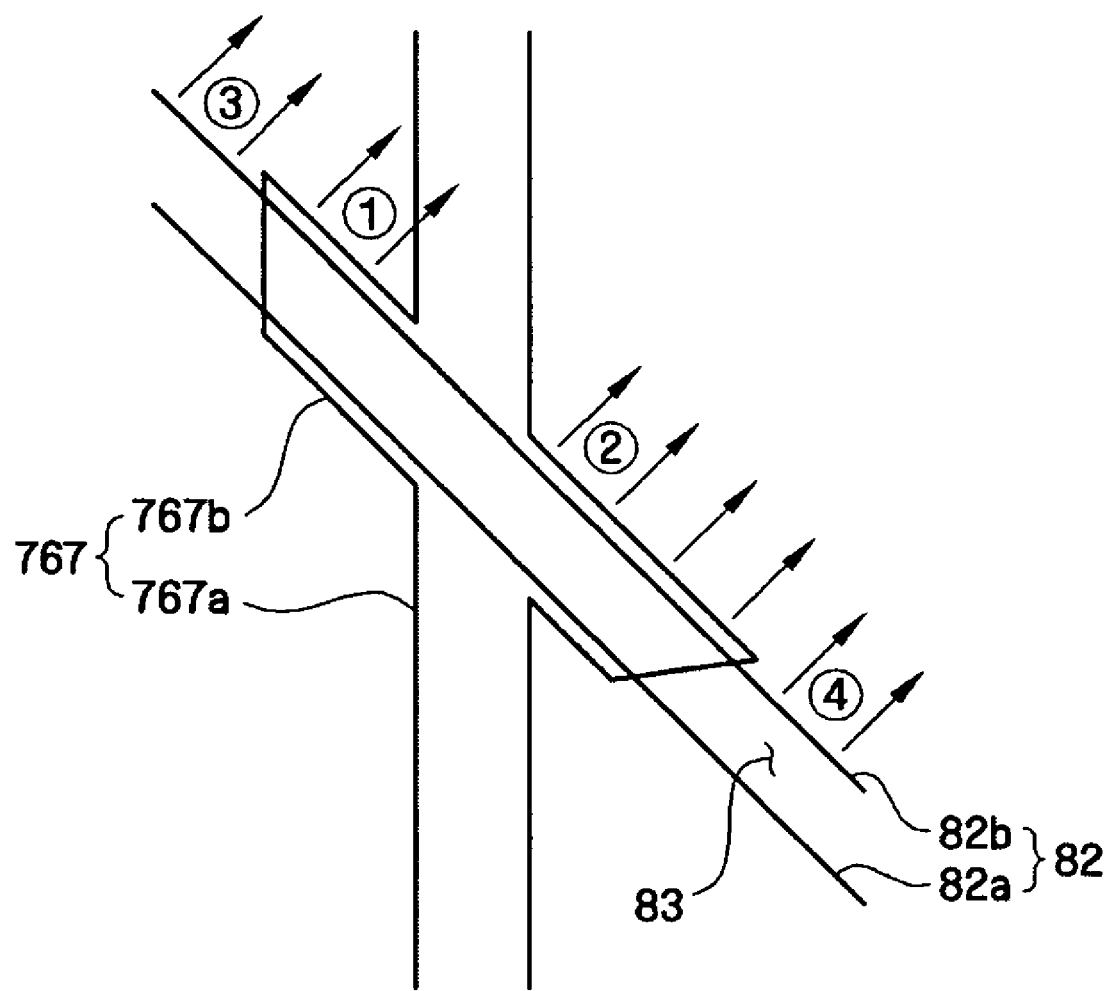
FIG. 10 is an enlarged layout view of a portion B of FIG. 8, showing a relationship between a pixel electrode and a coupling electrode connecting portion.

FIG. 8 is a layout of a TFT substrate of an LCD according to yet another embodiment of the present invention, FIG. 9 is a layout of an LCD including the TFT substrate of FIG. 8, and FIG. 10 is an enlarged layout view of a portion B of FIG. 8, for convenient explanation of a relationship between the pixel electrode and the coupling electrode connecting portion 567. A component having the same function as in the embodiments shown in FIGS. 1A through 5 is identified by the same reference numeral in FIGS. 8, 9, and 10, and repetitive description will be omitted. As shown in FIGS. 8 and 10, the LCD according to the current embodiment of the present invention has a similar structure as the LCD according to the above embodimenst except for the following features.

As shown in FIGS. 8 and 9, a coupling electrode connecting portion 767 according to the present invention includes a first portion 767a and a second portion 767b. The first portion 767a extends vertically in reference to FIG. 8, from the drain electrode 66 to the coupling electrode 69. The second portion 767b extends in an oblique direction with respect to FIG. 8, starting from the first portion 767a along a gap 83 at an intersection between the first portion 767a and the gap 83. Although the coupling electrode connecting portion 767 overlaps the gap 83 at the central area of a pixel, the second portion 767b is formed at the intersection between the second portion 767b of the coupling electrode connecting portion 767 and the gap 83, thereby preventing undesirable texture, light leakage, or instantaneous afterimage.

Specifically, as shown in FIG. 10, liquid crystals in regions 3 and 4 around a second sub-pixel electrode 82b adjacent to the gap 83 are inclined in a direction perpendicular to the gap 83, forming an angle with respect to the gate line. Liquid crystals in regions 1 and 2 around the intersection between the second portion 767a and the gap 83 have their major axis oriented at an angle to the gate line due to a lateral electric field caused by the second sub-pixel electrode 82b and the second portion 767b.

The second portion 767b of the coupling electrode connecting portion 767 is positioned in a direction that makes an angle with respect to the gate line and overlaps the gap 83, thereby improving the aperture ratio.

As described above, the present invention prevents texture, light leakage, or an instantaneous afterimage while improving the aperture ratio.

Those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A liquid crystal display (LCD) comprising:
   a first insulating substrate;
   a gate line formed on the first insulating substrate;
   a data line insulated from the gate line and extending substantially perpendicularly to the gate line, the gate line and the data line defining a pixel;

a thin film transistor (TFT) connected to the gate line and the data line;

a first sub-pixel electrode connected to the TFT;

a second sub-pixel electrode capacitively coupled to the first sub-pixel electrode through a coupling electrode, the second sub-pixel electrode being separated from the first sub-pixel electrode by a gap;

a second insulating substrate;

a common electrode formed on the second insulating substrate and including a domain divider; and a liquid crystal layer interposed between the first insulating substrate and the second insulating substrate, wherein a coupling electrode connecting portion connecting the TFT to the coupling electrode intersects the gap at a region along an edge of the pixel.

2. The LCD of claim 1, wherein the coupling electrode connecting portion includes a first portion parallel to the data line and a second portion forming an angle of substantially about 45 degrees or −45 degrees with respect to the gate line.

3. The LCD of claim 2, wherein the first portion extends from the TFT along the data line, and the second portion extends from the first portion to the coupling electrode.

4. The LCD of claim 3, wherein the first portion and the gap intersect each other.

5. The LCD of claim 3, wherein an intersection between the coupling electrode connecting portion and the gap overlaps the domain divider.

6. The LCD of claim 2, wherein the second portion extends at an angle to the data line and the first portion extends adjacent to the data line from the second portion to the coupling electrode along the data line.

7. The LCD of claim 6, wherein the first portion and the gap intersect with each other.

8. The LCD of claim 2 further comprising a black matrix formed on the second insulating substrate, wherein an intersection between the coupling electrode connecting portion and the gap overlaps the black matrix.

9. The LCD of claim 2, wherein the second portion overlaps with the domain divider.

10. The LCD of claim 1, further comprising a first and second polarizing plates formed on the first insulating substrate and the second insulating substrate, respectively, wherein the gap forms an angle of substantially about 45 degrees or −45 degrees with respect to transmission axes of the polarizing plates.

11. The LCD of claim 10, wherein the coupling electrode connecting portion overlaps an end portion of the gap adjacent to the data line.

12. The LCD of claim 1, further comprising a first and second polarizing plates formed on the first insulating substrate and the second insulating substrate, respectively, wherein the domain divider forms an angle of substantially about 45 degrees or −45 degrees with respect to transmission axes of the polarizing plates.

13. The LCD of claim 1, wherein a notch is formed in a predetermined portion of the domain divider.

14. A liquid crystal display (LCD) comprising:

a first insulating substrate;

a gate line formed on the first insulating substrate;

a data line insulated from the gate line and extending substantially perpendicularly to the gate line, the gate line and the data line defining a pixel;

a thin film transistor (TFT) connected to the gate line and the data line;

a first sub-pixel electrode connected to the TFT;

a second sub-pixel electrode capacitively coupled to the first sub-pixel electrode through a coupling electrode, the second sub-pixel electrode being separated from the first sub-pixel electrode by a gap that extends in a direction forming an angle with the data line;

a second insulating substrate;

a common electrode formed on the second insulating substrate and including a domain divider; and a liquid crystal layer interposed between the first insulating substrate and the second insulating substrate, wherein a coupling electrode connecting portion connecting the TFT to the coupling electrode includes a first portion extending along the gap at an intersection of the coupling electrode connecting portion and the gap.

15. The LCD of claim 14, wherein the coupling electrode connecting portion comprises a second portion extending from the TFT to the coupling electrode substantially in the direction of the data line, wherein the first portion branches from the second portion and extends in a direction substantially parallel to the gap.

16. The LCD of claim 14, further comprising a first and second polarizing plates formed on the first insulating substrate and the second insulating substrate, respectively, wherein the gap forms an angle of substantially about 45 degrees or −45 degrees with respect to transmission axes of the polarizing plates.

17. The LCD of claim 16, wherein the coupling electrode connecting portion overlaps the gap in the central portion of the pixel.

18. The LCD of claim 14, further comprising a first and second polarizing plates formed on the first insulating substrate and the second insulating substrate, respectively, wherein the domain divider forms an angle of substantially about 45 degrees or −45 degrees with respect to transmission axes of the polarizing plates.

19. The LCD of claim 14, wherein a notch is formed in a predetermined portion of the domain divider.

* * * * *